(12) United States Patent
Liu et al.

(10) Patent No.: US 10,419,745 B2
(45) Date of Patent: Sep. 17, 2019

(54) MECHANISM FOR HEAD MOUNTED DISPLAY THAT SIMULTANEOUSLY ADJUSTS DIOPTER AND INTERPUPILLARY DISTANCES USING A SINGLE KNOB ASSEMBLY

(71) Applicant: Shenzhen NED Optics Co., Ltd., Shenzhen, Guangdong (CN)

(72) Inventors: Donghua Liu, Guangdong (CN); Hongpeng Cao, Guangdong (CN); Huajun Peng, Guangdong (CN); Bingtao Xue, Guangdong (CN)

(73) Assignee: Shenzhen NED Optics Co., Ltd., Shenzhen (CN)

( * ) Notice: Subject to any disclaimer, the term of this patent is extended or adjusted under 35 U.S.C. 154(b) by 0 days.

(21) Appl. No.: 15/744,273

(22) PCT Filed: Sep. 5, 2016

(86) PCT No.: PCT/CN2016/098005
§ 371 (c)(1),
(2) Date: Jan. 12, 2018

(87) PCT Pub. No.: WO2017/096981
PCT Pub. Date: Jun. 15, 2017

(65) Prior Publication Data
US 2018/0213212 A1 Jul. 26, 2018

(30) Foreign Application Priority Data
Dec. 11, 2015 (CN) .......................... 2015 1 0919770

(51) Int. Cl.
*H04N 13/332* (2018.01)
*G02B 27/01* (2006.01)
(Continued)

(52) U.S. Cl.
CPC ......... *H04N 13/332* (2018.05); *G02B 6/0016* (2013.01); *G02B 27/0172* (2013.01);
(Continued)

(58) Field of Classification Search
CPC .... H04N 13/332; H04N 13/344; G02B 27/01; G02B 27/0176
See application file for complete search history.

(56) References Cited

U.S. PATENT DOCUMENTS 5,539,422 A * 7/1996 Heacock ............ G02B 27/0172
345/8
6,219,250 B1 * 4/2001 Palmer .................. G02B 23/12
174/50.54
(Continued)

FOREIGN PATENT DOCUMENTS

| CN | 205333966 U | 6/2016 | |
|---|---|---|---|
| GB | 2271195 A * | 4/1994 | ............... G02B 7/12 |
| JP | 08111878 A | 4/1996 | |

OTHER PUBLICATIONS

Machine English translation of JP 8-111878A downloaded from Google patents Feb. 8, 2019, document published Apr. 30, 1996 (Year: 1996).*

(Continued)

*Primary Examiner* — Jamie J Atala
*Assistant Examiner* — Michael Robert Cammarata

(57) ABSTRACT

A head-mounted display apparatus is disclosed which including a main frame arranged with left and right display screens, left and right eyepieces arranged in correspondence with the left and right display screen. The main frame is further arranged with a diopter and interpupillary distance adjustment mechanism for adjusting a distance between the display screens and the eyepieces and a distance between two eyepieces at each side. The diopter and interpupillary distance adjustment mechanism employs a rotation opera- (Continued)

tion and a sliding operation of a same knob assembly for achieving adjustments of a diopter and an interpupillary distance of the head-mounted display apparatus. That is, not only the operation is easier, but also the product structure is simplified, so that the head-mounted display apparatus has a more compact structure, lighter weight and more comfortable and convenient use.

17 Claims, 7 Drawing Sheets

(51) Int. Cl.
  *H04N 13/344* (2018.01)
  *F21V 8/00* (2006.01)
(52) U.S. Cl.
  CPC ....... *G02B 27/0176* (2013.01); *H04N 13/344* (2018.05); *H04N 2213/001* (2013.01)

(56) References Cited

U.S. PATENT DOCUMENTS

| | | | | |
|---|---|---|---|---|
| 9,529,194 | B2* | 12/2016 | Yoo | G02B 27/0101 |
| 2001/0028498 | A1* | 10/2001 | Haga | G02B 23/12 |
| | | | | 359/407 |
| 2012/0069448 | A1* | 3/2012 | Sugihara | G02B 27/0176 |
| | | | | 359/643 |
| 2016/0116748 | A1* | 4/2016 | Carollo | H04N 13/286 |
| | | | | 345/8 |
| 2016/0349519 | A1* | 12/2016 | Yang | G02B 27/0176 |
| 2016/0349521 | A1* | 12/2016 | Zhao | G02B 27/0093 |

OTHER PUBLICATIONS

International Search Report of PCT Patent Application No. PCT/CN2016/098005 dated Nov. 28, 2016.

* cited by examiner

MECHANISM FOR HEAD MOUNTED DISPLAY THAT SIMULTANEOUSLY ADJUSTS DIOPTER AND INTERPUPILLARY DISTANCES USING A SINGLE KNOB ASSEMBLY

TECHNICAL FIELD

The present disclosure relates generally to the technical field of intelligent terminal, and more particularly, to a head-mounted display.

BACKGROUND

With the continuous development of electronic apparatuses towards super micromation, as well as the development of new computer, microelectronics, optoelectronics and communication theory and technology, the new wearable computing model of the concept that computing should adapt to human needs and contribute to the combination between human and machine has become possible. Wearable computing applications emerge in fields of military, industrial, medical, education, consumption and so on. In a typical wearable computing system architecture, the head-mounted display is a key component, which directs video image light emitted by the miniature image display apparatus (e.g. transmissive or reflective liquid crystal display, organic electroluminescent apparatuses, DMD apparatuses) to the user's pupil via the optical technology, and forms virtual and magnifying images in the near eye range and provides the user with intuitive and visual image, video and text information.

In order to achieve a better display effect, the head-mounted display should be tightly attached to the user's eyes and face around when being worn, such that the user having poor eyesight cannot use glasses while wearing the head-mounted display. Accordingly, the user can only watch relatively vague pictures, thus greatly affecting the user experience.

The prior art has disclosed an eyepiece structure capable of adjusting the visibility precisely through an eyepiece tube, an eyepiece base connected with the eyepiece tube via multiple screw threads, an eyepiece base backing ring sleeved on the eyepiece base, an eyepiece group embedded in the eyepiece base, a retaining ring provided with a groove, and other structures such as a positioning groove, a positioning bead and so on. Although the precise visibility adjustment of the eyepiece structure can be achieved by such manner, however no disclosure about how to realize the adjustment of the distance between the bilateral eyepieces, namely the interpupillary distance adjustment, by coordinating the visibility adjustment structure with other structures in bilateral eyepieces is exposed.

In another prior art, a head-mounted display is disclosed, in which the diopter and interpupillary adjustments are achieved via an X-axis bracket and a Y-axis bracket to adapt the user with different visual conditions. In this scheme, two lens tubes are driven to slide along X-axis direction on the X-axis bracket to adjust the center distance between the two lenses for adapting the users with different interpupillary distances. A Y-axis adjustment component is used for driving the X-axis bracket to slide relative to the Y-axis bracket along the Y-axis direction for adjusting the longitudinal distance between the two lenses and the display panel.

In yet another prior art, an adjustable head-mounted display is disclosed, in which scheme, a diopter adjustment component is provided on the main frame for adjusting the distance between the front lens tube and the back lens tube of the lens group at each side separately, and an interpupillary adjustment component is also provided for interpupillary adjustment. When the interpupillary adjustment turntable rotates, two transmission elements are brought to move leftward and rightward synchronously via the center gear for adjusting the distance between the front lens tubes of the lens group at the two sides, thus achieving the interpupillary adjustment of the head-mounted display.

The second and third schemes can achieve the visibility (diopter) adjustment and interpupillary adjustment at the same time. However, both of the lenses or lens tubes at both sides should be moved at the same time to adjust the interpupillary, which not only results in complex structure and large volume, but also results in the misplacement between the optical center and the display center thus directly affecting the display effect at the screen edge, as there is just one display screen whose effective display picture may be moved relative to the lenses or lens tubes at both sides during the interpupillary adjustment. Meanwhile, during the diopter adjustment, the movement of the lenses or lens tubes would change the distance between the lenses or lens tubes and the display screen at the same time, while changing the distance between the human eyes and the lenses or lens tubes, that is, changing the eye distance. However, the change of the eye distance would reduce the adjustment precision of the diopter thus affecting the viewing performance.

In additional, as the head-mounted display of compact size, light weight, convenient wearing and lighten load and so on is the development trend, the complicated structure is bound to result in increased volume and weight of the head-mounted display, thereby affecting its use effect.

SUMMARY

The object of the present application is to provide a compact head-mounted display whose diopter and interpupillary can be adjusted simultaneously with a high precision via one knob, aiming at the above defects of the prior art.

In one aspect, a head-mounted display is provided for solving above technical problems, which including a main frame arranged with a left display screen and a right display screen, a left eyepiece and a right eyepiece arranged in correspondence with the left display screen and the right display screen; wherein the main frame is further arranged with a diopter and interpupillary distance adjustment mechanism for adjusting a distance between the display screens and the eyepieces and for adjusting a distance between two eyepieces at each side; wherein the diopter and interpupillary distance adjustment mechanism includes a drive assembly and a knob assembly, wherein the diopter and interpupillary distance adjustment mechanism employs a rotation operation and a sliding operation of a same knob assembly for achieving adjustments of a diopter and an interpupillary distance of the head-mounted display.

In the head-mounted display according to the present application, wherein the drive assembly includes a drive rod, a tension spring and a cam, the knob assembly is used for driving the cam to rotate;

the display screen is fixed on a display screen mounting frame, one end of the drive rod is fixedly connected to the display screen mounting frame, and the other end of the drive rod is suspended;

one end of the tension spring is fixed on the main frame, and the other end of the tension spring is fixed on the display screen mounting frame;

the drive rod is arranged with a projection contacting an edge of the cam whose central axis is perpendicular to the drive rod, and the knob assembly is fixedly connected to the cam.

In the head-mounted display according to the present application, wherein the knob assembly includes an adjustment knob arranged with screws, an annular element arranged with a plurality of circular holes, and a turntable fixed with a displacement restriction ball matched with the circular hole;

a portion of the displacement restriction ball is hold in the turntable, and other portion of the displacement restriction ball is exposed from one side surface of the turntable close to the annular element to match with the circular holes on the annular element for implementing a sliding displacement restriction;

the turntable is fixedly connected to the cam via a bolt, and the adjustment knob is fixedly connected to the turntable via its screws;

the annular element is located between the cam and the turntable and is hold in the main frame, wherein during the diopter adjustment, the turntable is rotated relative to the annular element.

In the head-mounted display according to the present application, wherein the turntable includes a bottom shell which is arranged with a hole position for accommodating and holding the displacement restriction ball, and a spring sheet for blocking the displacement restriction ball, wherein the bottom shell and the spring sheet are fixedly connected via the bolt;

the turntable further includes an upper cover which is fixed on the bottom shell, and the spring sheet is positioned between the upper cover and the bottom shell;

a surface of the upper cover is arranged with a boss with having a plurality of projections, the adjustment knob is correspondingly arranged with a plurality of recesses for accommodating the projections, wherein the adjustment knob and the turntable are fixedly connected through the coordination of the projections and recesses.

In the head-mounted display according to the present application, wherein a guide plate is provided between the adjustment knob and the turntable, and the screw is fixedly connected with the guide plate via its end;

the main frame is arranged with a housing assembled between the guide plate and the turntable, the housing is arranged with a guide groove at a position corresponding to the guide plate which is embedded in the guide groove and slideable relative to the guide groove, wherein a length of the guide groove along a relative sliding direction is larger than that of the guide plate along the relative sliding direction.

In the head-mounted display according to the present application, wherein the main body frame includes a left mounting frame for fixing the left eyepiece and the left display screen, and a right mounting frame for fixing the right eyepiece and the right display screen.

In the head-mounted display according to the present application, wherein the diopter and interpupillary distance adjustment mechanism further includes a guide shaft mounting frame which is respectively arranged with a first guide shaft group and a second guide shaft group;

the left mounting frame is relatively slidably arranged on the first guide shaft group, the right mounting frame is relatively slidably arranged on the second guide shaft group.

In the head-mounted display according to the present application, wherein the guide shaft mounting frame is arranged with a restriction block for restricting a range of the interpupillary distance adjustment.

In the head-mounted display according to the present application, wherein the first guide shaft group includes a first guide shaft and a second guide shaft arranged in parallel along an interpupillary distance adjustment direction, the second guide shaft group includes a third guide shaft and a fourth guide shaft arranged in parallel along the interpupillary distance adjustment direction.

In the head-mounted display according to the present application, wherein the guide shaft mounting frame is arranged with a first shaft hole and a second shaft hole for mounting the third guide shaft, the right mounting frame is corresponding arranged with a third shaft hole for mounting the third guide shaft;

the first shaft hole is arranged far away from the left mounting frame, the second shaft hole is arranged close to the right mounting frame;

the third guide shaft passes through the first shaft hole, the second shaft hole and the second shaft hole sequentially.

In the head-mounted display according to the present application, wherein a sliding guide rail for adjusting the interpupillary distance is arrange between the left mounting frame and the right mounting frame.

In the head-mounted display according to the present application, wherein a PCB board is arranged on the guide shaft mounting frame, wherein the PCB board is arranged on one surface of the guide shaft mounting frame opposite to the first guide shaft group and the second guide shaft group.

In the head-mounted display according to the present application, wherein the guide shaft mounting frame has an L-shape plate structure, wherein the first guide shaft group and the second guide shaft group are arranged on one surface of the guide shaft mounting frame, and a PCB board is arranged on the other surface of the guide shaft mounting frame.

In the head-mounted display according to the present application, wherein a portion of the annular element is arranged with continuous circular holes.

In the head-mounted display according to the present application, wherein a peripheral edge of the annular element is arranged with symmetrical protrusion parts, and the main frame is arranged with depression parts correspondingly clamped with the protrusion parts.

In the head-mounted display according to the present application, wherein the adjustment knob is arranged with a diopter scale, and the guide plate is arranged with an indication corresponding to the diopter scale.

In the head-mounted display according to the present application, wherein the guide plate is arranged with an interpupillary distance scale, and the guide groove is arranged on an extending surface of its side wall with an indication corresponding to the interpupillary distance scale.

In the head-mounted display according to the present application, wherein the left mounting frame and the right left mounting frame are respectively arranged with an interpupillary distance adjustment sheet;

the guide shaft mounting frame is arranged with through holes, a plurality of grooves which are transversely and uniformly distributed are arranged on a surface of the guide shaft mounting frame opposite to the first guide shaft group;

one end of the interpupillary distance adjustment sheet is fixed on the left mounting frame or the right mounting frame, the other end of the interpupillary distance adjustment sheet contacts with the grooves via passing through the through holes and is arranged with a flange adapting a shape of the groove, wherein during a movement of the left mounting frame or the right mounting frame relative to the guide shaft mounting frame, the flange coordinates sequentially to clamp and be embedded in the grooves which are transversely and uniformly distributed.

Following technical effects can be obtained by the present application. As a rotation operation and a sliding operation of a same knob assembly is used for achieving adjustments of a diopter and an interpupillary distance of the head-mounted display, that is the diopter of the head-mounted display can be adjusted by rotating the knob assembly while the interpupillary distance of the head-mounted display can be adjusted by sliding the knob assembly, not only the operation is easier, but also the product structure is simplified, so that the head-mounted display has a more compact structure, lighter weight and more comfortable and convenient use.

BRIEF DESCRIPTION OF THE DRAWINGS

In order to more clearly illustrate the embodiments of the present application or the technical solutions in the prior art, the present application is further illustrated combining the embodiments and drawings attached. The drawings in the following description are only some embodiments of the present application. For one skilled in the art, other drawings may be obtained from these drawings without any inventive work.

DETAILED DESCRIPTION OF THE PREFERRED EMBODIMENT

In order to clarify the objects, technical solutions and advantages of the embodiments of the present application, the following detailed description will be made for the technical solution in the embodiments of the present application. Apparently, the described embodiments are just some rather than all embodiments of the present application. All other embodiments obtained by one skilled in the art without any inventive work based on the embodiments disclosed in the application fall into the scope of the present application.

Figure 1:
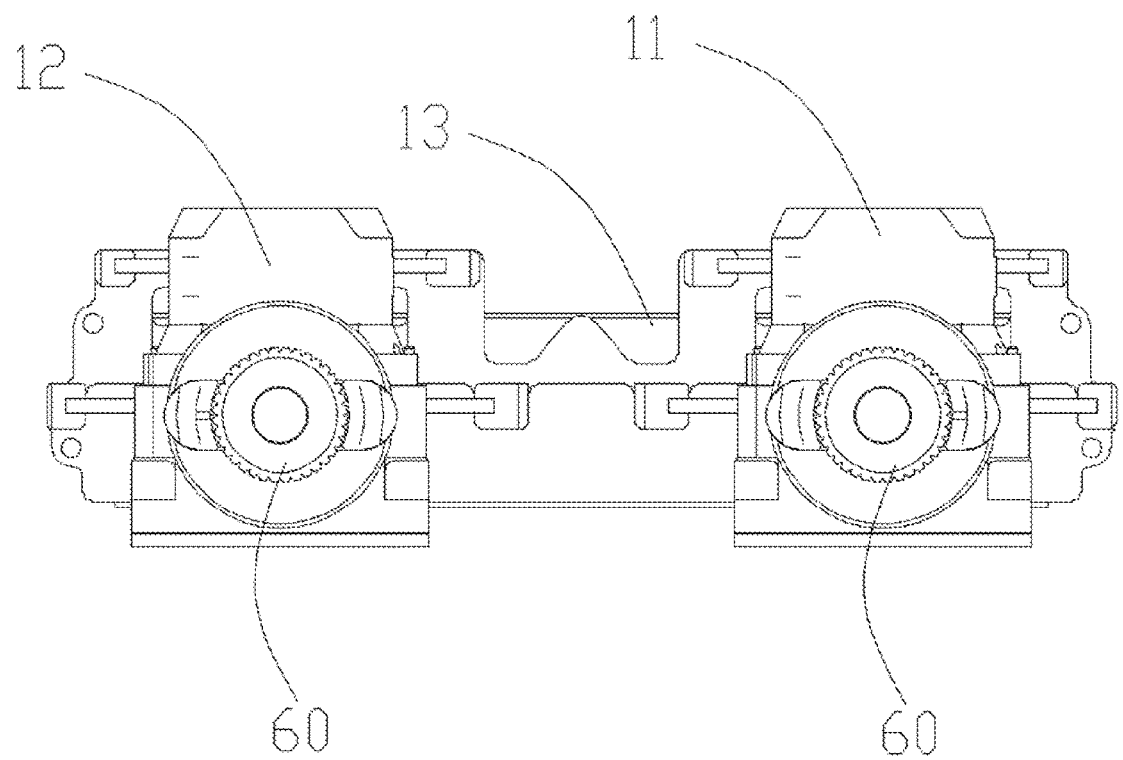
FIG. 1 is a front structure diagram of the head-mounted display according to a preferred embodiment of the present application.
Figure 2:
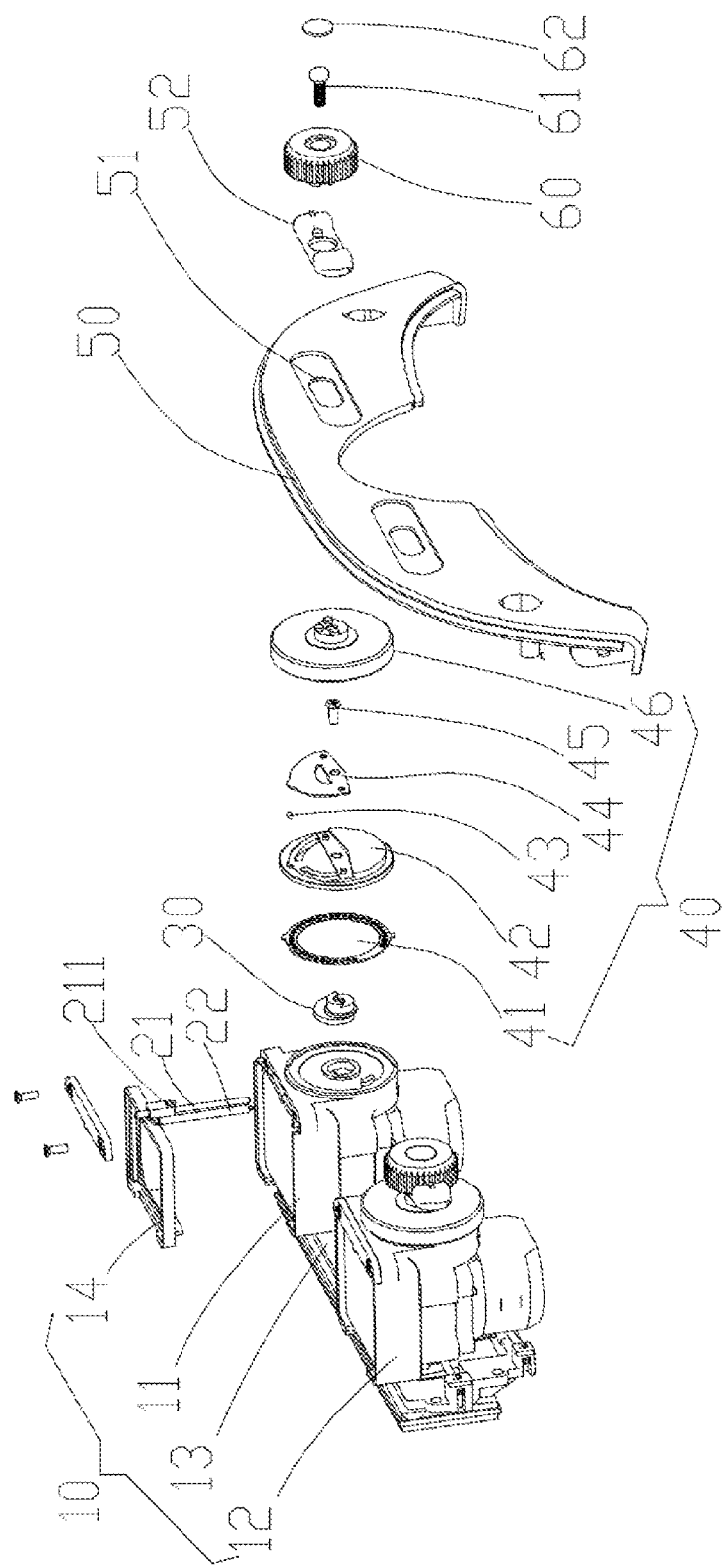
FIG. 2 is a first partial explosion diagram of the head-mounted display according to a preferred embodiment of the present application.

The structure of the head-mounted display according to a preferred embodiment of the present application is shown in FIGS. 1 and 2, which includes a main frame 10 arranged with a left display screen and a right display screen, a left eyepiece and a right eyepiece arranged in correspondence with the left display screen and the right display screen. The main frame 10 is further arranged with a diopter and interpupillary distance adjustment mechanism for adjusting a distance between the display screens and the eyepieces and for adjusting a distance between two eyepieces at each side. The diopter and interpupillary distance adjustment mechanism includes a drive assembly and a knob assembly. The diopter and interpupillary distance adjustment mechanism employs a rotation operation and a sliding operation of a same knob assembly for achieving adjustments of a diopter and an interpupillary distance of the head-mounted display, that is the diopter of the head-mounted display can be adjusted by rotating the knob assembly while the interpupillary distance of the head-mounted display can be adjusted by sliding the knob assembly, not only the operation is easier, but also the product structure is simplified, so that the head-mounted display has a more compact structure, lighter weight and more comfortable and convenient use.

In the above embodiment, two sets of above diopter and interpupillary distance adjustment mechanism are arranged symmetrically on the main frame 10 for adjusting the diopter of the left eye and the diopter of the right eye, respectively. Meanwhile, the knob assembly of each diopter and interpupillary distance adjustment mechanism can adjust the distance between the two eyepieces, independently. To be specific, when rotating the knob assembly, the drive assembly drives the display screen to move while the eyepieces never move, however when sliding the knob assembly, the eyepiece and the display screen at the same side move together. As the diopter and interpupillary distance adjustment mechanism changes the distance between the eyepiece and the display screen via moving the display screen, thus adjusting the diopter. During the adjustment, the eyepiece is kept immobile, such that the eye distance is kept constant, which makes the pictures watched by the human eyes more clear. As the above diopter and interpupillary distance adjustment mechanism adjusts the interpupillary distance by moving the location of the eyepiece and the display screen at single side integrally, that is, when sliding the knob assembly, the eyepiece and the display screen at the same side move together, such that no misplacement is generated between the optical center of the lens and the display center of the display screen during the interpupillary adjustment. Accordingly, no loss of display effect is resulted, and the display effect seen by the human eye becomes better.

Figure 5:
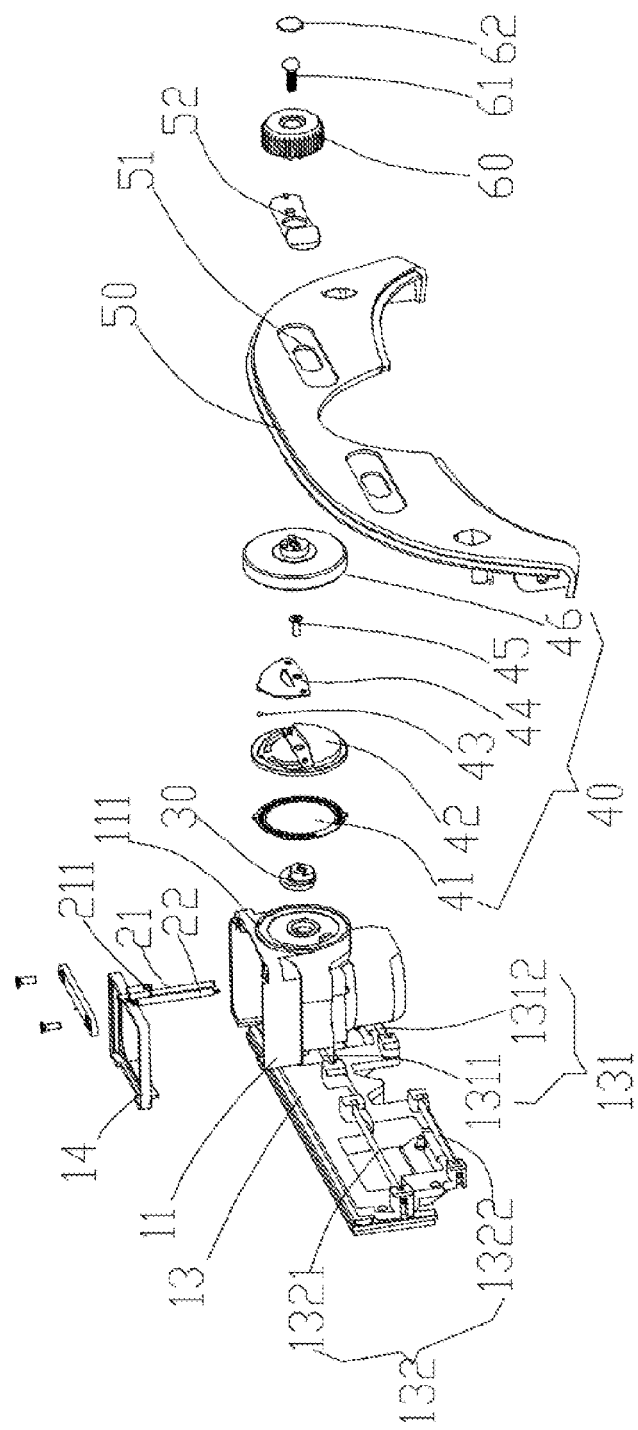
FIG. 5 is a second partial explosion diagram of the head-mounted display according to a preferred embodiment of the present application.

In a further embodiment, as shown in FIG. 2 and FIG. 5, the drive assembly of the head-mounted display includes a drive rod 21, a tension spring 22 and a cam 30. The knob assembly is used for driving the cam 30 to rotate. The display screen is fixed on a display screen mounting frame 14. One end of the drive rod 21 is fixedly connected to the display screen mounting frame 14, and the other end of the drive rod 21 is suspended. One end of the tension spring 22 is fixed on the main frame 10, and the other end of the tension spring 22 is fixed on the display screen mounting frame 14. The drive rod 21 is arranged with a projection 211 contacting an edge of the cam 30 whose central axis is perpendicular to the drive rod 21. The knob assembly is fixedly connected to the cam 30. When rotating the knob assembly, the cam 30 is brought to rotate, such that the edge of the cam 30 pushes the drive rod 21 and the projection 211 to implement a rectilinear movement. As one end of the drive rod 21 is fixedly connected to the display screen mounting frame 14, and the other end of the drive rod 21 is suspended, so the rectilinear movement of the drive rod 21 can bring the display screen mounting frame 14 and the display screen thereon to move. When the cam 30 rotates in a forward direction to push the drive rod 21 for moving along a direction away from the eyepiece, the tension spring 22 is in a stretched state, while when the cam 30 rotates in a reverse direction, it brings the display screen mounting frame 14 and the display screen thereon to move in a direction close to the eyepiece under the elastic restoring force of the tension spring 22, such that the distance between the display screen and the eyepiece can be adjusted, that is, implementing the diopter adjustment.

In the above embodiment, preferably, as shown in FIG. 2, the tension spring 22 and the driving rod 21 are arranged in parallel, such that the stretching and restoring directions of the tension spring 22 and the rectilinear movement of the driving rod 21 are in two parallel straight lines. The number of the tension spring 22 may be one, two or more.

Figure 3:
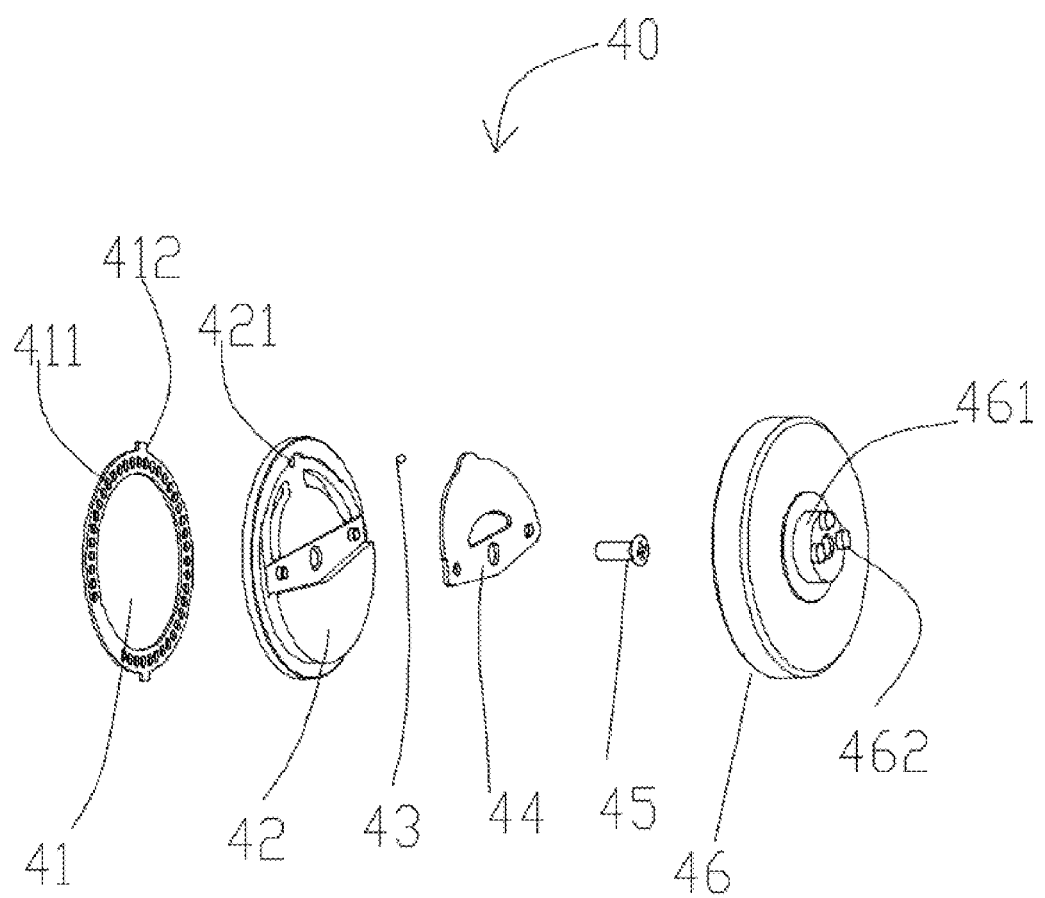
FIG. 3 is a structure diagram of the turntable assembly structure of the head-mounted display according to a preferred embodiment of the present application.

In a further embodiment, as shown in FIGS. 2 and 3, the head-mounted display includes an adjustment knob 60 arranged with screws 61, an annular element 41 arranged with a plurality of circular holes 411, and a turntable 40 fixed with a displacement restriction ball 43 matched with the circular hole 411. A portion of the displacement restriction ball 43 is held in the turntable 40, and other portion of the displacement restriction ball 43 is exposed from one side surface of the turntable 40 close to the annular element 41 to match with the circular holes 411 on the annular element 41 for implementing a sliding displacement restriction. The turntable 40 is fixedly connected to the cam 30 via a bolt 45, and the adjustment knob 60 is fixedly connected to the turntable 40 via its screws 61. The annular element 41 is located between the cam 30 and the turntable 40 and is held in the main frame 10. During the diopter adjustment, the turntable 40 is rotated relative to the annular element 41. During the adjustment process, the annular element 41 is fixed on the main frame 10 and never moves, and its screw 61 can bring the turntable 40 to rotate via rotating the adjustment knob 60. An exposed portion of the displacement restriction ball 43 in the turntable 40 slides on the annular element 41 and is trapped in the plurality of circular holes on the annular element 41 sequentially during the rotation process. In such a way, a multi-gear displacement restriction is formed during the diopter adjustment process so that the user can adjust the diopter of the head-mounted display to the optimum state.

In the head-mounted display of the above embodiment, as shown in FIG. 2, the adjustment knob 60 can be a rotatable structure, and the screw 61 and the adjustment knob 60 can be integrally arranged or separately arranged. When the screw 61 is arranged separately with the adjustment knob 60, the screw 61 can pass through the adjustment knob 60. The end of the screw 61 can be provided with a cap cover 62 or an ornament.

In the head-mounted display of the above embodiment, as shown in FIG. 3 while referring FIG. 2, a portion of the annular element 41 is arranged with continuous circular holes 411, whose diameters adapt with the size of the exposed portion of the displacement restriction ball 43, and the other portion of the annular element 41 has no holes. In such a way, there is a clear starting point and a clear end point during the diopter adjustment, thus facilitating the user to record the best diopter position of the diopter adjustment.

In the head-mounted display of the above embodiment, as shown in FIG. 3 while referring FIGS. 2 and 5, a peripheral edge of the annular element 41 is arranged with symmetrical protrusion parts 412, and the main frame 10 is arranged with depression parts 111 corresponding to the protrusion parts. The protrusion parts 412 and the depression parts 111 coordinate with each other to hold the annular element 41 on the main frame 10 such that the annular element 41 would never rotate with the adjustment knob 60 and the cam 30. Or, other methods can be employed to fix the annular element 41 on the main frame 10, such as via a direct fixation with fasteners.

Figure 4:
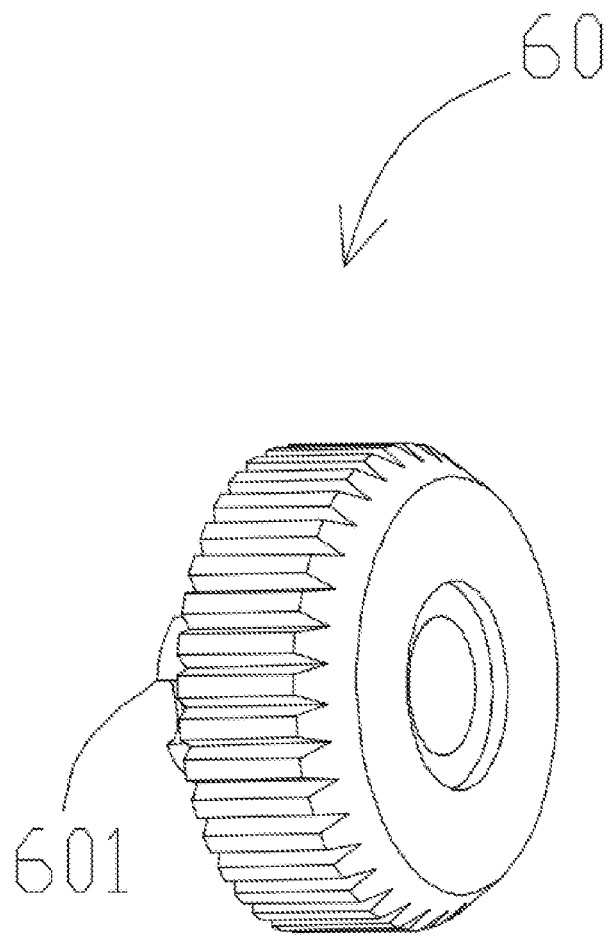
FIG. 4 is a structure diagram of the adjustment knob of the head-mounted display according to a preferred embodiment of the present application.

In the head-mounted display of the above embodiment, as shown in FIG. 3, while referring FIGS. 2 and 4, the turntable 40 includes a bottom shell 42 which is arranged with a hole position 421 for accommodating and holding the displacement restriction ball 43, and a spring sheet 44 for blocking the displacement restriction ball 43. The bottom shell 42 and the spring sheet 44 are fixedly connected via the bolt 45. The turntable 40 further includes an upper cover 46 which is fixed on the bottom shell 42, and the spring sheet 44 is positioned between the upper cover 46 and the bottom shell 42. The surface of the upper cover 46 is arranged with a boss 461 with a plurality of (at least two) projections 211. The adjustment knob 60 is correspondingly arranged with a plurality of recesses for accommodating the projections 211. The adjustment knob 60 and the turntable 40 are fixedly connected through the coordination of the projections 211 and recesses. When being installed, the displacement restriction ball 43 is located at the hole position 421 of the bottom shell 42, then covered by the spring sheet 44. After that the spring sheet 44 and the bottom shell 42 are fixed via the bolt 45. Then spring sheet 44 is covered with the upper cover 46, and fixed by glue or other manners. In such a way, the bottom shell 42, the spring sheet 44 and the upper cover 46 are connected to form the whole turntable 40. The assembled turntable 40 coordinates with the depression parts 601 on the adjustment knob 60 through the projections 211 on the upper cover 46, such that the turntable 40 can rotate with the adjustment knob 60.

In the head-mounted display of the above embodiment, as shown in FIG. 3, the hole position 421 is a through hole whose size just satisfies that a portion of the displacement restriction ball 43 is hold on the turntable 40, and the other portion of the displacement restriction ball 43 is exposed.

In a further embodiment, as shown in FIGS. 2, 5, 6 and 7, the main frame 10 of the above head-mounted display includes a left mounting frame 11 for fixing the left eyepiece and the left display screen, and a right mounting frame 12 for fixing the right eyepiece and the right display screen. The diopter and interpupillary distance adjustment mechanism further includes a guide shaft mounting frame 13 which is respectively arranged with a first guide shaft group 131 and a second guide shaft group 132. The left mounting frame 11 is relatively slidably arranged on the first guide shaft group 131, and the right mounting frame 12 is relatively slidably arranged on the second guide shaft group 132. The guide plate 52 is provided between the adjustment knob 60 and the turntable 40, and the screw 61 is fixedly connected with the guide plate 52 via its end. The main frame 10 is arranged with a housing 50 assembled between the guide plate 52 and the turntable 40. The housing 50 is arranged with a guide groove 51 at a position corresponding to the guide plate 52 which embedded in the guide groove 51 and slideable relative to the guide groove 51. The length of the guide groove 51 along a relative sliding direction is larger than that of the guide plate 52 along the relative sliding direction.

In the above embodiment, by sliding the adjustment knob 60, and the guide plate 52 together with the adjustment knob 60 implement a rectilinear movement relative to the guide groove 51, so as to bring the left mounting frame 11 and the right mounting frame 12 to move along the first guide shaft group 131 or the second guide shaft group 132 respectively, thereby changing the distance between the two eyepieces, namely, the distance between the two eyepieces can be changed by the eyepiece movement brought by one adjustment knob 60 at the single side, thus adjusting the interpupillary distance of the head-mounted display.

Figure 6:
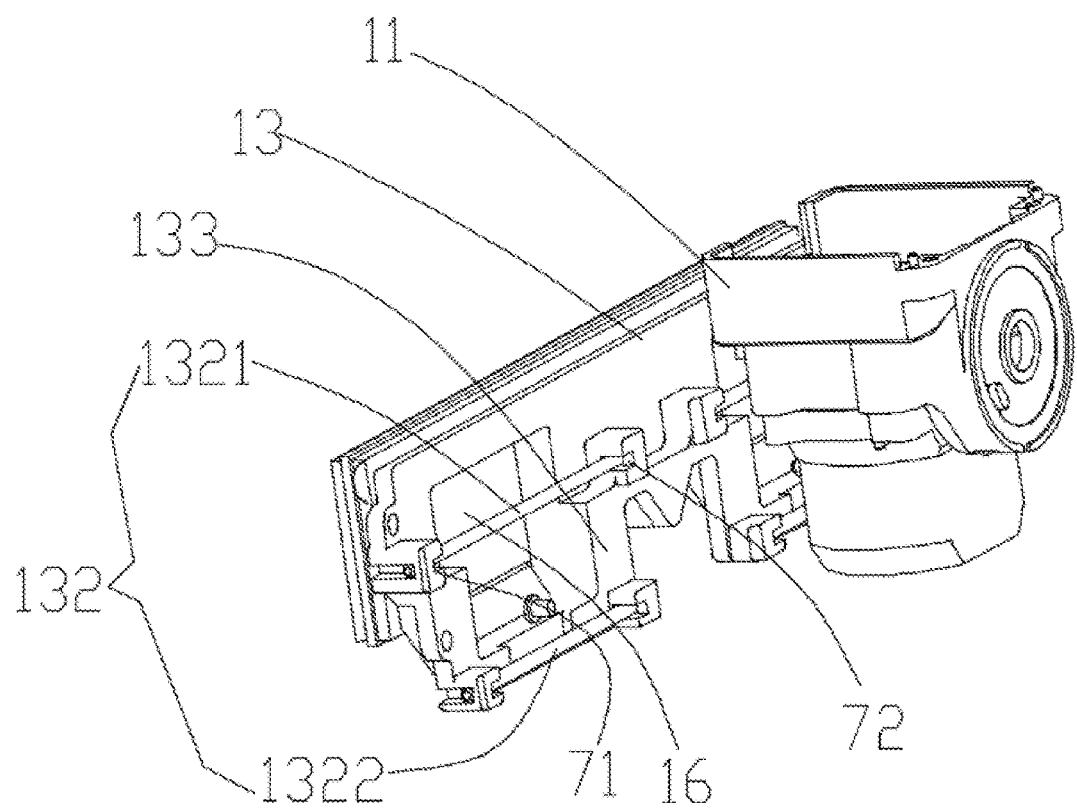
FIG. 6 is a partial structure diagram of the head-mounted display according to a preferred embodiment of the present application.

Preferably, in the head-mounted display of the above embodiment, as shown in FIG. 6, the guide shaft mounting frame 13 is arranged with a restriction block 133 for restricting a range of the interpupillary distance adjustment.

Furthermore, in the head-mounted display of the above embodiment, as shown in FIG. 5, the first guide shaft group 131 includes a first guide shaft 1311 and a second guide shaft 1312 arranged in parallel along the interpupillary distance adjustment direction, while the second guide shaft group 132 includes a third guide shaft 1321 and a fourth guide shaft 1322 arranged in parallel along the interpupillary distance adjustment direction.

Figure 7:
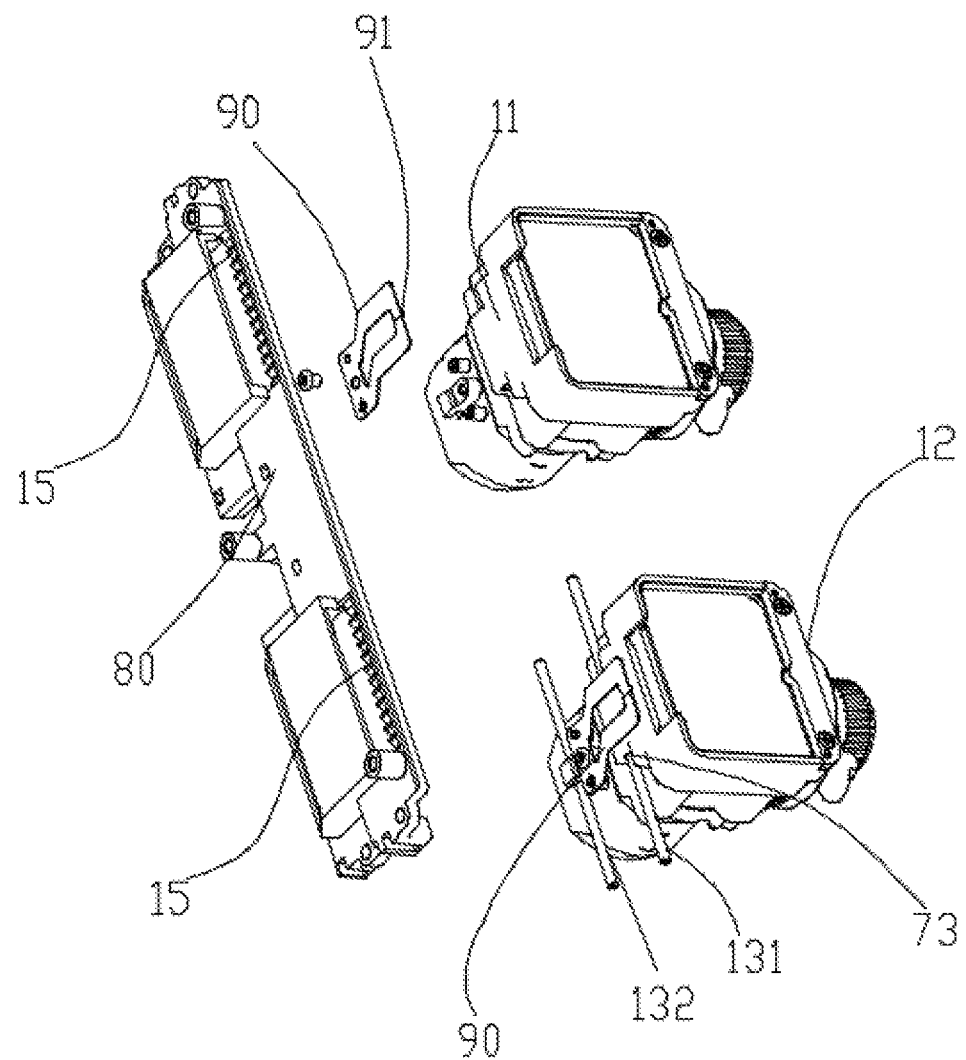
FIG. 7 is a third partial explosion diagram of the head-mounted display according to a preferred embodiment of the present application.

Furthermore, in the head-mounted display of the above embodiment, as shown in FIGS. 6 and 7, the guide shaft mounting frame 13 is arranged with a first shaft hole 71 and a second shaft hole 72 for mounting the third guide shaft 1321, and the right mounting frame 12 is corresponding arranged with a third shaft hole 73 for mounting the third guide shaft 1321. The first shaft hole 71 is arranged far away from the left mounting frame 11, the second shaft hole 72 is arranged close to the right mounting frame 12. The third guide shaft 1321 passes through the first shaft hole 71, the second shaft hole 72 and the second shaft hole 73 sequentially. The mounting manners of the first guide shaft 1311, the second guide shaft 1312 and the fourth guide shaft 1322 are same as that of the third guide shaft 1321. During the assembling, the left mounting frame 11 or the right mounting frame 12 is firstly placed at a corresponding location close to the guide shaft mounting frame 13, then the first guide shaft 1311, the second guide shaft 1312, the third guide shaft 1321 and the fourth guide shaft 1322 are passed through corresponding shaft holes sequentially to complete the assembling. The whole operation is very easy.

Furthermore, in the head-mounted display of the above embodiment, as shown in FIG. 7, a PCB board 80 is arranged on the guide shaft mounting frame 13, wherein the PCB board 80 is arranged on one surface of the guide shaft mounting frame 13 opposite to the first guide shaft group 131 and the second guide shaft group 132. Or the guide shaft mounting frame 13 has an L-shape plate structure, wherein the first guide shaft group 131 and the second guide shaft group 132 are arranged on one surface of the guide shaft mounting frame 13, and the PCB board 80 is arranged on the other surface of the guide shaft mounting frame 13. Among them, the L-shape plate structure can be a one-piece structure, or separated structures which are detachable.

Preferably, as shown in FIG. 4, the adjustment knob 60 is arranged with a diopter scale on its edge or top surface. Meanwhile the guide plate 52 is arranged with an indication corresponding to the diopter scale for facilitating the users to record the optimal diopter state and avoid repeated adjustments.

Furthermore, in the head-mounted display of the above embodiment, as shown in FIGS. 5, 6 and 7, the left mounting frame and the right left mounting frame are respectively arranged with an interpupillary distance adjustment sheet 90. The guide shaft mounting frame 13 is arranged with through holes 16, and a plurality of grooves 15 which are transversely and uniformly distributed are arranged on a surface of the guide shaft mounting frame 13 opposite to the first guide shaft group 131. One end of the interpupillary distance adjustment sheet 90 is fixed on the left mounting frame 11 or the right mounting frame 12, and the other end of the interpupillary distance adjustment sheet 90 contacts with the grooves 15 via passing through the through holes 16 and is arranged with a flange 91 adapting a shape of the groove 15. During a movement of the left mounting frame 11 or the right mounting frame 12 relative to the guide shaft mounting frame 13, the flange 91 coordinates sequentially to clamp and be embedded in the grooves 15 which are transversely and uniformly distributed, so as to implement the displacement restriction of the interpupillary distance adjustment. Conversely, the interpupillary adjustment sheet 90 can be mounted in an opposite direction, which belongs to an equivalent alternative of the present application.

Preferably, the guide plate 52 is arranged with an interpupillary distance scale (unshown), and the guide groove 51 is arranged on an extending surface of its side wall with an indication corresponding to the interpupillary distance scale for facilitating the users to record the optimal interpupillary distance state and avoid repeated adjustments.

As the diopter and interpupillary distance adjustment mechanism in the head-mounted display of the present application changes the distance between the eyepiece and the display screen via moving the display screen thus adjusting the diopter. During the adjustment, the eyepiece is kept immobile, such that the eye distance is kept constant, which makes the pictures watched by the human eyes more clear. As the above diopter and interpupillary distance adjustment mechanism adjusts the interpupillary distance by moving the location of the eyepiece and the display screen at single side integrally, that is, when sliding the knob assembly, the eyepiece and the display screen at the same side move together, such that no misplacement is generated between the optical center of the lens and the display center of the display screen during the interpupillary adjustment. Accordingly, no loss of display effect is resulted, and the display effect seen by the human eye becomes better. Furthermore, as a rotation operation and a sliding operation of a same knob assembly is used for achieving adjustments of a diopter and an interpupillary distance of the head-mounted display, that is the diopter of the head-mounted display can be adjusted by rotating the knob assembly while the interpupillary distance of the head-mounted display can be adjusted by sliding the knob assembly, not only the operation is easier, but also the product structure is simplified, so that the head-mounted display has a more compact structure, lighter weight and more comfortable and convenient use.

It should be understood that, for one skilled in the art, the foregoing description can be modified or altered, and all such modifications and alterations fall into the scope of the attached claims.

What claimed is:

1. A head-mounted display apparatus including a main frame arranged with a left display screen and a right display screen, a left eyepiece and a right eyepiece arranged in correspondence with the left display screen and the right display screen; wherein the main frame is further arranged with a diopter and interpupillary distance adjustment mechanism for adjusting a distance between the display screens and the eyepieces and for adjusting a distance between two eyepieces at each side; wherein the diopter and interpupillary distance adjustment mechanism includes a drive assembly and a knob assembly, wherein the diopter and interpupillary distance adjustment mechanism employs a rotation operation and a sliding operation of the knob assembly for achieving adjustments of a diopter and an interpupillary distance of the head-mounted display apparatus;

wherein the drive assembly includes a drive rod, a tension spring and a cam, the knob assembly is used for driving the cam to rotate;

the left display screen and the right display screen are fixed on a display screen mounting frame, one end of the drive rod is fixedly connected to the display screen mounting frame, and the other end of the drive rod is suspended;

one end of the tension spring is fixed on the main frame, and the other end of the tension spring is fixed on the display screen mounting frame;

the drive rod is arranged with a projection contacting an edge of the cam whose central axis is perpendicular to the drive rod, and the knob assembly is fixedly connected to the cam.

2. The head-mounted display apparatus according to claim 1, wherein the knob assembly includes an adjustment knob arranged with screws, an annular element arranged with a plurality of circular holes, and a turntable fixed with a displacement restriction ball matched with the circular hole;

a portion of the displacement restriction ball is held in the turntable, and other portion of the displacement restriction ball is exposed from one side surface of the turntable close to the annular element to match with the circular holes on the annular element for implementing a sliding displacement restriction;

the turntable is fixedly connected to the cam via a bolt, and the adjustment knob is fixedly connected to the turntable via its screws;

the annular element is located between the cam and the turntable and is hold in the main frame, wherein during the diopter adjustment, the turntable is rotated relative to the annular element.

3. The head-mounted display apparatus according to claim 2, wherein the turntable includes a bottom shell which is arranged with a hole position for accommodating and holding the displacement restriction ball, and a spring sheet for blocking the displacement restriction ball, wherein the bottom shell and the spring sheet are fixedly connected via the bolt;

the turntable further includes an upper cover which is fixed on the bottom shell, and the spring sheet is positioned between the upper cover and the bottom shell;

a surface of the upper cover is arranged with a boss with having a plurality of projections, the adjustment knob is correspondingly arranged with a plurality of recesses for accommodating the projections, wherein the adjustment knob and the turntable are fixedly connected through the coordination of the projections and recesses.

4. The head-mounted display apparatus according to claim 1, wherein the main frame includes a left mounting frame for fixing the left eyepiece and the left display screen, and a right mounting frame for fixing the right eyepiece and the right display screen.

5. The head-mounted display apparatus according to claim 2, wherein the main frame includes a left mounting frame for fixing the left eyepiece and the left display screen, and a right mounting frame for fixing the right eyepiece and the right display screen.

6. The head-mounted display apparatus according to claim 3, wherein the main frame includes a left mounting frame for fixing the left eyepiece and the left display screen, and a right mounting frame for fixing the right eyepiece and the right display screen.

7. The head-mounted display apparatus according to claim 4, wherein a guide plate is provided between the adjustment knob and the turntable, and the screw is fixedly connected with the guide plate via its end;

the main frame is arranged with a housing assembled between the guide plate and the turntable, the housing is arranged with a guide groove at a position corresponding to the guide plate which is embedded in the guide groove and slideable relative to the guide groove, wherein a length of the guide groove along a relative sliding direction is larger than that of the guide plate along the relative sliding direction;

wherein the diopter and interpupillary distance adjustment mechanism further includes a guide shaft mounting frame which is respectively arranged with a first guide shaft group and a second guide shaft group;

the left mounting frame is relatively slidably arranged on the first guide shaft group, the right mounting frame is relatively slidably arranged on the second guide shaft group.

8. The head-mounted display apparatus according to claim 7, wherein the guide shaft mounting frame is arranged with a restriction block for restricting a range of the interpupillary distance adjustment.

9. The head-mounted display apparatus according to claim 7, wherein the first guide shaft group includes a first guide shaft and a second guide shaft arranged in parallel along an interpupillary distance adjustment direction, the second guide shaft group includes a third guide shaft and a fourth guide shaft arranged in parallel along the interpupillary distance adjustment direction.

10. The head-mounted display apparatus according to claim 9, wherein the guide shaft mounting frame is arranged with a first shaft hole and a second shaft hole for mounting the third guide shaft, the right mounting frame is correspondingly arranged with a third shaft hole for mounting the third guide shaft;

the first shaft hole is arranged far away from the left mounting frame, the second shaft hole is arranged close to the right mounting frame;

the third guide shaft passes through the first shaft hole, the second shaft hole and the second shaft hole sequentially.

11. The head-mounted display apparatus according to claim 7, wherein a printed circuit board (PCB) is arranged on the guide shaft mounting frame, wherein the PCB is arranged on one surface of the guide shaft mounting frame opposite to the first guide shaft group and the second guide shaft group.

12. The head-mounted display apparatus according to claim 7, wherein the guide shaft mounting frame has an L-shape plate structure, wherein the first guide shaft group and the second guide shaft group are arranged on one surface of the guide shaft mounting frame, and a PCB is arranged on the other surface of the guide shaft mounting frame.

13. The head-mounted display apparatus according to claim 2, wherein a portion of the annular element is arranged with circular holes which are continuously placed.

14. The head-mounted display apparatus according to claim 2, wherein a peripheral edge of the annular element is arranged with symmetrical protrusion parts, and the main frame is arranged with depression parts correspondingly clamped with the protrusion parts.

15. The head-mounted display apparatus according to claim 7, wherein the adjustment knob is arranged with a diopter scale, and the guide plate is arranged with an indication corresponding to the diopter scale.

16. The head-mounted display apparatus according to claim 7, wherein the guide plate is arranged with an interpupillary distance scale, and the guide groove is arranged on an extending surface of its side wall with an indication corresponding to the interpupillary distance scale.

17. The head-mounted display apparatus according to claim 7, wherein the left mounting frame and the right left mounting frame are respectively arranged with an interpupillary distance adjustment sheet;

the guide shaft mounting frame is arranged with through holes, a plurality of grooves which are transversely and uniformly distributed are arranged on a surface of the guide shaft mounting frame opposite to the first guide shaft group;

one end of the interpupillary distance adjustment sheet is fixed on the left mounting frame or the right mounting frame, the other end of the interpupillary distance adjustment sheet contacts with the grooves via passing through the through holes and is arranged with a flange adapting a shape of the groove, wherein during a movement of the left mounting frame or the right mounting frame relative to the guide shaft mounting frame, the flange coordinates sequentially to clamp and be embedded in the grooves which are transversely and uniformly distributed.

\* \* \* \* \*